United States Patent [19]
Hooper

[11] 3,898,157
[45] Aug. 5, 1975

[54] TWO STAGE PRESSURE PULP SCREEN DEVICE WITH STATIONARY CYLINDRICAL SCREEN

[75] Inventor: Sydney William Henry Hooper, Sherbrooke, Canada

[73] Assignee: S. W. Hooper & Co., Ltd., Sherbrooke, Canada

[22] Filed: Mar. 19, 1974

[21] Appl. No.: 452,694

[30] Foreign Application Priority Data
Mar. 23, 1973 United Kingdom............ 14196/73

[52] U.S. Cl. ............ 209/306; 209/273; 210/398
[51] Int. Cl.² .................................... B07B 1/20
[58] Field of Search .......... 209/273, 305, 306, 379; 210/398, 415

[56] References Cited
UNITED STATES PATENTS

| | | | |
|---|---|---|---|
| 639,433 | 12/1899 | Pratt | 209/305 |
| 1,537,691 | 5/1925 | Priem | 209/273 |
| 3,232,436 | 2/1966 | Nilsson | 210/298 |
| 3,245,535 | 4/1966 | Cowan | 209/273 X |
| 3,255,883 | 6/1966 | Nelson | 209/273 X |
| 3,399,772 | 9/1968 | Solomon | 209/273 |
| 3,420,373 | 1/1969 | Hunter | 209/273 |
| 3,545,621 | 12/1970 | Lamont | 210/398 |
| 3,677,402 | 7/1972 | Holz | 209/273 |
| 3,713,536 | 1/1973 | Hooper | 209/273 |
| 3,726,401 | 4/1973 | Bolton | 209/273 X |

*Primary Examiner*—Robert Halper
*Attorney, Agent, or Firm*—Fetherstonhaugh & Co.

[57] ABSTRACT

A two stage pulp screening device is disclosed of particular use as a high capacity unit replacing two separate units. The device has an upper pulp screening chamber and a lower pulp screening chamber, the lower chamber has a stationary cylindrical screen with a streamlined rotor mounted therein for rotation about a vertical axis. The upper chamber has a further stationary cylindrical screen with at least one foil cleaning bar mounted therein for rotation about the same vertical axis. In the upper chamber around the further screen is a stationary inlet baffle which forms an annular space between the screen and the baffle. In this space is at least one helical baffle which forms a spiral passage descending beside the screen. A reject discharge is provided in the lower portion of the annular space for removing all rejects and pulp slurry that has not passed through the screen.

10 Claims, 2 Drawing Figures

TWO STAGE PRESSURE PULP SCREEN DEVICE WITH STATIONARY CYLINDRICAL SCREEN

This invention relates to the rotary screening of pulp stock and more particularly to a two stage vertical pressure type screening device, the first stage being a knotter having a coarse screen or a slotted screen with the pulp slurry inflowing a stationary screen and rejecting the coarser particles in the pulp. Alternatively, the first stage may be a fine screen to effect series or double screening. The second stage preferably has an impeller mounted on a specially shaped rotor in relation to a stationary screen, the pulp slurry outflowing the screen and ensuring the maximum separation of the pulp fibres from any reject particles.

A pulp screen device of the vertical pressure type is shown in my U.S. Pat. No. 3,713,536 which issued on Jan. 30, 1973. Such a screen removes reject particles such as fibre bundles and slivers suspended in a pulp slurry and introduces a circular rotation and an axial velocity to the slurry as it passes down the inner side of a stationary screen plate. In this type of screen device it is sometimes necessary to first pass the pulp slurry through a knotter or coarse screen to remove the knots of wood and large pieces of reject material from the slurry. In the screen device described and shown in my previous patent, the pulp slurry enters an inlet chamber which surrounds a stationary inlet ring. At entry the slurry is given a rotational motion and must rise up and overflow an inlet ring before entering the screen area. Thus any heavy objects tend to settle to the bottom of the inlet chamber and may be removed from time to time.

Two stage screening devices have been known in the past, two examples of such devices are disclosed by Lamort in U.S. Pat. No. 3,545,621 granted Dec. 8, 1970 and A.B. Knutsilpalater in Swedish printed Patent application 348,243 filed Feb. 17, 1970. Both these publications show two screen stages in line on the same vertical axis with the first stage being on top and the screens both being stationary and approximately the same diameter. The pulp slurry inflows through the first stage screen and outflows through the second stage screen. Both disclosures show rotating foils within the screens to prevent the perforations or slots from plugging.

The pulp screen device shown in my previous patent incorporates an impeller in the shape of a parabolic cone in order to streamline the flow of pulp slurry outflowing through the screen. This type of screen permits a higher capacity of pulp slurry to be passed through the screening device. The addition of a first stage screen of the type known in the prior art to such a pulp screen device tends to reduce the pulp slurry capacity through the device. Thus one requires to fit a high capacity first stage screen to incorporate the full advantages to my previous screen device.

It is an object of the present invention to provide a high capacity two stage pressure pulp screen which includes a knotter or coarse screen thus avoiding the necessity of two separate screen devices. It is a further object of the invention to provide a vertical two stage screen which removes large pieces of wood and knots from a pulp slurry in the first stage coarse screen and removes wood slivers from the slurry in the second stage. A still further object is to provide an adaptor for a vertical single stage screening device which may be mounted on top of the single stage to turn a single stage unit into a double stage unit.

Yet a further object is to provide a vertical two stage screen having fine screens in both stages, thus enabling a pulp slurry to obtain a higher degree of pulp cleanliness than is possible with a single stage fine screen. Yet another object is to provide a vertical two stage screen having slotted plates in one stage and perforated plates in the other stage to remove different types of impurities with different aspect ratios. For instance, perforated plates are sometimes preferred for removal of long slivers, and slotted plates are preferred for removal of short, stubby, chopped slivers.

These and other objects are primarily attained by providing a two stage pulp screening device including an upper pulp screening chamber and lower pulp screening chamber, the upper pulp screening chamber having a first stationary cylindrical screen with at least one foil cleaning bar internally mounted for rotation about a vertical axis, the lower pulp screening chamber having a second stationary cylindrical screen below and in line with the first screen with a rotor internally mounted for rotation about said vertical axis, the improvement comprising a cylindrical inlet baffle surrounding the first screen forming an annular space between the inlet baffle and the first screen, at least one helical baffle mounted on the inlet baffle within the annular space adapted to feed pulp slurry in a helical path downwards to a lower portion of the annular space, and a reject discharge means positioned in the lower portion of the annular space.

The first stage of the two stage pressure pulp screen device may be a knotter, a coarse screen or a fine screen which allows the pulp fibres to pass through the screen but prevents large rejects from continuing to the second stage. The second stage screen is preferably the same as that shown in my earlier patent which comprises a pulp screen device of the vertical pressure type having a stationary cylindrical screen and an impeller mounted for rotation within the screen. The impeller is attached to a conical rotor which is mounted on an impeller shaft and defines a screening compartment. The conical rotor has an upper portion and a lower portion with the peripheral wall of the upper portion having an angle to the axis of the impeller greater than the angle of the peripheral wall of the lower portion of the rotor. A series of pairs of impeller blades radiates from the conical wall and define radial passages extending the length of the wall. Dilution water is fed to these radial passages and thus to the face of the cylindrical screen.

The first stage of the device has a stationary cylindrical screen mounted on the top of the second stage screen. A cylindrical inlet baffle surrounds the cylindrical screen leaving an annular space between the screen and the baffle. In this space are mounted at least one and preferably two co-axial spiral baffles which are adapted to lead the pulp slurry spirally downwards as it passes through the first stage screen. The spiral baffles end in the lower portion of the annular space where preferably a shower of dilution water is injected in this lower portion to dilute the pulp slurry. A reject discharge is positioned in this lower portion, and all the pulp slurry including reject particles and dilution water that has not passed through the screen exit through the discharge. Rotating foils, attached to the top of the second stage impeller shaft and positioned adjacent to stationary screen, provide the necessary action to keep the screen perforations from plugging. In the first stage, the pulp slurry enters the screen device tangentially and rises up the outside of the cylindrical inlet baffle to spill over into the annular space between the inlet baffle and the stationary screen. The pulp slurry that passes through the first stage screen enters the second stage screen area and is screened in the same manner as in my previous patent.

In drawings which illustrate embodiments of the invention,

Figure 1:
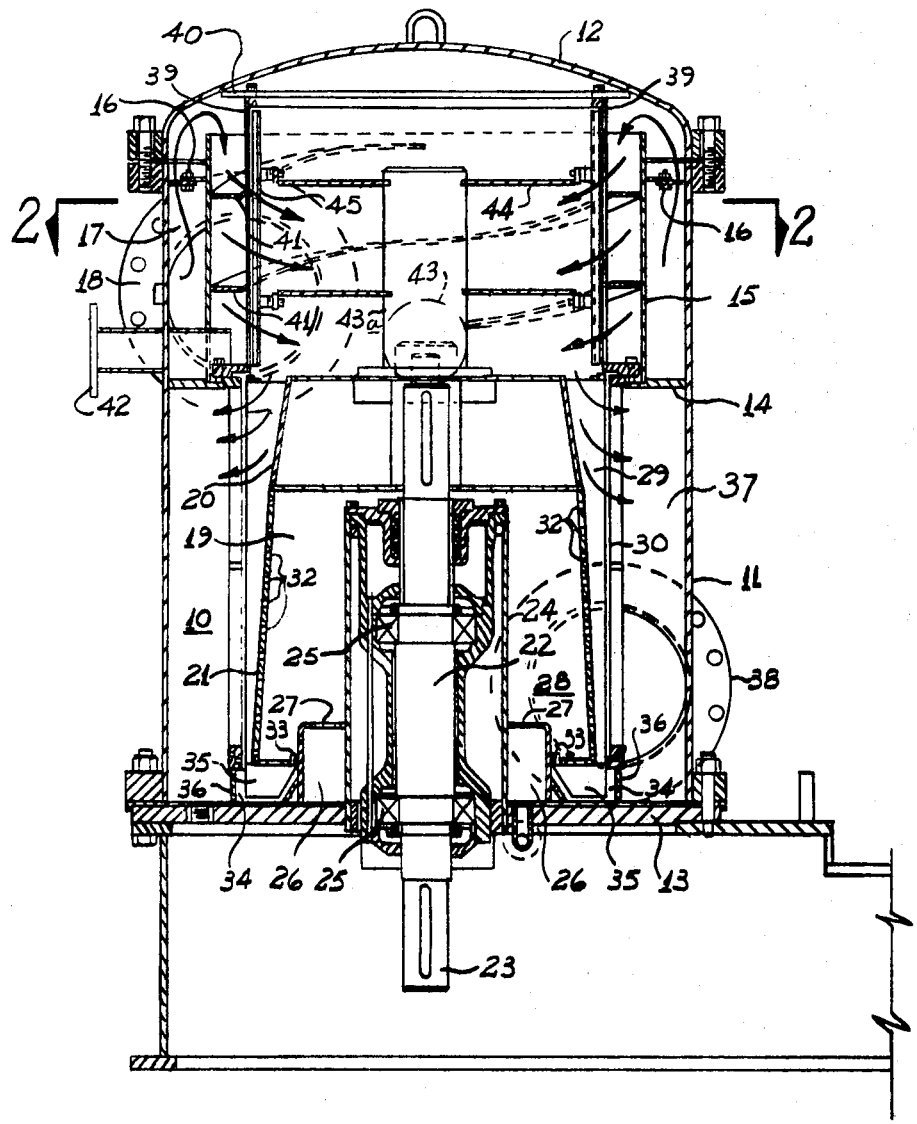
FIG. 1 is a sectional elevation through one embodiment of a two stage pressure pulp screen device of the present invention.
Figure 2:
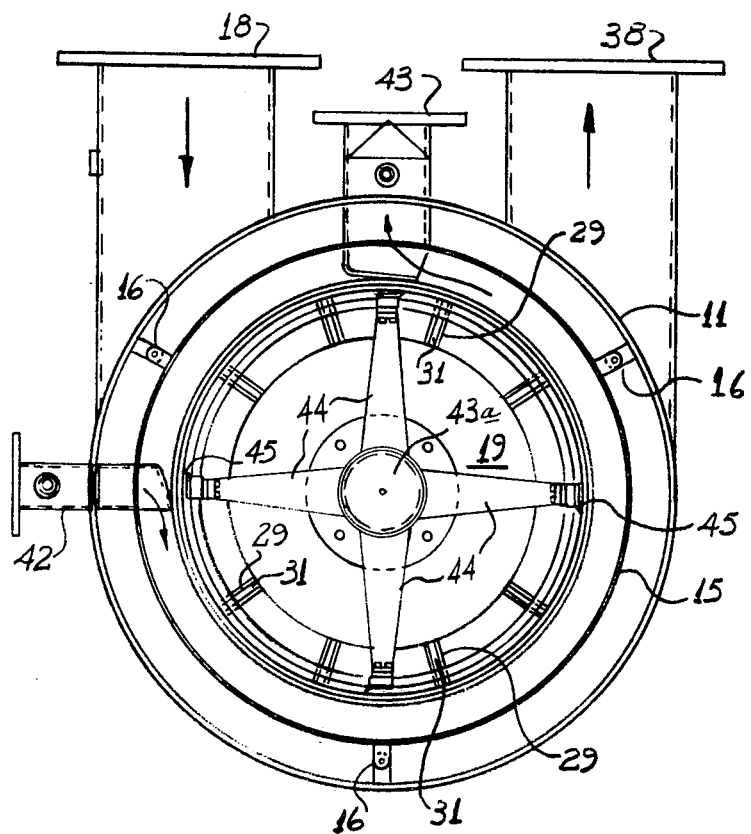
FIG. 2 is a plan section taken at line 2—2 of FIG. 1.

Referring now to FIGS. 1 and 2, the pulp screen device 10 includes a vertically disposed circular housing 11, a top sealing cover 12 and a bottom sealing plate 13. The circular housing 11 is provided on the inside with an annular support ring 14 which divides the pulp screen device into a first stage above the annular support ring 14 and a second stage below the annular support ring 14.

A cylindrical inlet baffle 15 is located in the first stage resting on the annular support ring 14. The inlet baffle 15 is concentric with the circular housing 11 supported by brackets 16 and defines an annular inlet section 17 between the inlet baffle 15 and the circular housing 11. The pulp slurry enters the annular inlet section 17 through a tangential inlet 18.

In the second stage an impeller is attached to a rotor 19 which is formed of a truncated cone having an upper portion 20 and a lower portion 21. The peripheral wall of the upper portion 20 being disposed at a greater angle to the axis of the pulp screen device 10 than the peripheral wall of the lower portion 21. The rotor 19 is supported on and is rotated by a drive shaft 22 which may be driven by a pulley sheave (not shown) attached to the drive end 23 at the base of the shaft 22. An axial sleeve 24 projects upwards from the bottom sealing plate 13 into the interior of the rotor 19 and houses the bearings 25 supporting the drive shaft 22.

Dilution water is supplied to an annular shower water distributing chamber 26 built around the lower portion of the sleeve 24. A series of apertures 27 in the top wall of the chamber 26 permits the flow of water into a chamber 28 within the lower portion 21 of the rotor 19. A series of pairs of impeller blades 29 radiate outwards from the outer surface of the rotor 19 at spaced intervals around the circumference thereof and extend to within a short distance of the inner surface of the second stage stationary cylindrical screen 30. These pairs of blades 29 form longitudinal nozzles 31 extending the full length of the rotor 19. The peripheral wall of the lower portion 21 of the rotor 19 has perforations 32 in the spaces between the pairs of blades 29 to permit the flow of dilution water from the chamber 28 into the nozzles 31 and thus against the interior surface of the cylindrical screen 30.

A labyrinth seal 33 between the lower end wall of the rotor 19 and the vertical wall of the water distribution chamber 26 permits a control volume of dilution water to flow downwards into a reject chamber 34. One blade of each pair of blades 29 extends downwards into the reject chamber 34 to form paddles 35. These paddles 35 assist in propelling reject material towards a reject discharge housing (not shown). The second stage cylindrical screen 30 is supported by a lower support ring 36 from the bottom sealing plate 13. The top of the cylindrical screen 30 is secured to the annular support ring 14 mid-way between the first stage and the second stage. The space between the stationary cylindrical screen 30 and the circular housing 11 forms an annular outlet section 37 where the screened pulp slurry collects and passes to the outlet 38.

A first stage stationary cylindrical screen 39 is positioned directly above and in line with the second stage cylindrical screen 30. The first stage screen 39 is approximately the same diameter as the second stage screen 30 and is fastened at its base to the annular support ring 14. At the top, the screen 39 has a seal ring 40 connected to the top sealing cover 12 to prevent any pulp slurry entering the inner space confined by the screen 39.

Between the cylindrical inlet baffle 15 and the first stage cylindrical screen 39 at least one and preferably two coaxial helical baffles 41 are attached to the cylindrical inlet baffle 15. These helical baffles 41 commence 180° apart at the top of the inlet baffle 15 spiralling downwards so as to force the pulp slurry to move around the first stage screen 39. The helical baffles 41 end just before the base of the first screen 39 at the point where preferably a first stage dilution water connection 42 produces a shower of dilution water in the direction of rotation of the pulp slurry to maintain the velocity of the pulp slurry and dilute the consistency of the slurry thus improving the separation of good fibres from rejectable material. A first stage reject outlet 43 is positioned at the same level as the first stage dilution water connection 42, with an opening facing the direction of rotation of the pulp slurry, thus the pulp slurry including rejects and dilution water which have not passed through the screen 39 exit through the reject outlet 43.

An extension shaft 43a attached to the top of the second stage impeller shaft 22 supports four rotating arms 44, each arm having at its end a foil cleaning bar 45 which extends for the full height of the first stage screen 39. The cleaning bars 45 practically touch the inside surface of the first stage screen 39 and on rotating, clean the screen to prevent any perforations or slots from plugging.

In operation a pulp slurry enters the tangential inlet 18 and rotates about the inlet section 17 rising up to spill over the top of the cylindrical inlet baffle 15. Still having a rotational movement, the pulp slurry moves down the co-axial spiral baffles 41. The majority of the fibres in the pulp slurry pass through the first stage cylindrical screen 39. The remainder for the pulp slurry together with any rejects that may exist, continue moving down the co-axial spiral baffles until reaching the bottom of the screen 39 where a shower of dilution water is injected through the water connection 42 to dilute the mixture of pulp slurry and reject material thus aiding the pulp fibres to pass through the screen 39. The shower of dilution water enters the last turn of the spiral passageway where the remaining pulp slurry, including reject material and dilution water, is removed from the pulp screen device.

The foil cleaning bars 45 act as pressure foils and as these foils 45 pass the inside surface of the screen 39 they initially cause a pressure to upset the fibres and push them to the outside surface of the screen 39 and then as soon as the foil 45 passes a particular point on the screen, a vacuum results pulling the fibres through the perforations or slots and upsetting the mat of pulp fibres that builds up on the outside surface of the screen 39. This method of cleaning is referred to as a "pulsating method."

The first stage screen is an inward flow screen and the screen may be either a knotter, that is to say, a screen to remove the knots from the pulp slurry, a coarse screen to remove the coarse rejects such as coarse fibres from the pulp slurry or alternatively, a fine screen or slotted screen plate to effect double or series screening. After the pulp slurry has passed through the first stage screen, they pass down to the second stage screen which is referred to as an outflowing screen and pass through in the same manner as that described in my previous patent. The upper portion 20 and the lower portion 21 of the impeller rotor 14 with their different slopes allows the pulp slurry to follow a practically parabolic flow. This results in a streamlined flow of the pulp slurry passing down to the surface of the second stage stationary cylindrical screen 30 where further dilution water is added from the longitudinal nozzles 31 between the pairs of blades 29. The screened pulp slurry passes out through the stationary screen 30 into the outlet section 37 and then through the outlet 38.

In a preferred embodiment, the pulp slurry enters the first stage at a speed of approximately 5 ft. per second. The rotational speed of the impeller rotor 19 and the foil cleaning bars 45 is preferably 400 r.p.m. This gives a surface speed of approximately 3000 ft. per minute for each foil passing the inside surface of the screen 39.

A pulp screen device of the type shown in my earlier patent may be modified to form a two stage screening device of the present invention. Similar other types of high capacity screening devices may also be modified to form a two stage screening device of the present invention. The majority of screening devices with a stationary screen and an impeller or foil rotating therein have an annular support ring 14 which divides the pulp slurry input from the pulp slurry output, and it is on this that the first stage cylindrical screen 39 is mounted together with the cylindrical inlet baffle 15 and the coaxial helical baffles 41. An extension shaft 43a is connected to the top of the regular impeller shaft 22, and this in turn supports the foil cleaning bars 45. A dilution water connection 42 and reject outlet 43 for the first stage must be added passing through the circular housing above the annular support ring 14.

Further improvements and modifications may be made to the embodiment of the present invention disclosed herein without departing from the scope of the present invention. For instance, the particular impeller arrangement of my previous patent may well be replaced by an impeller having single blades rather than pairs of blades and a different arrangement for dispensing dilution water. Furthermore, the impeller may be replaced by a foil arrangement to prevent a mat of fibres building up on the screen.

The embodiments of the invention in which an exclusive property or privilege is claimed are defined as follows:

1. A two stage pulp screening device including an upper pulp screening chamber and a lower pulp screening chamber, the upper pulp screening chamber having a first stationary cylindrical screen with at least one foil cleaning bar internally mounted for rotation about a vertical axis, the lower pulp screening chamber having a second stationary cylindrical screen below and in line with the first screen, a rotor internally mounted for rotation about said vertical axis, the improvement comprising a cylindrical inlet baffle surrounding the first screen and forming a first annular space between the inlet baffle and the first screen, at least one helical baffle mounted on the inlet baffle in the first annular space and extending about the first screen to feed pulp slurry in a helical path through the first annular space downwards to a lower portion of the first annular space, a further annular space surrounding the inlet baffle and in communication with a pulp slurry such that pulp slurry is fed into said further annular space, means for blocking off the first annular space and further annular space from communication with each other at the lower ends thereof, and said upper chamber being opened over the top of said inlet baffle, placing the first annular space and the further annular space into communication with each other over the inlet baffle, whereby pulp slurry fed into the upper chamber is first received in the further annular space, where it rises up the outer side of the inlet baffle and spills over into the first annular space, and a reject discharge means positioned in the lower portion of the first annular space.

2. The two stage pulp screening device according to claim 1 including the addition of a means to provide a shower of dilution water to the lower portion of the first annular space.

3. The two stage pulp screening device according to any of claim 1 wherein the first screen is a coarse screen and the second screen is a fine screen.

4. The two stage pulp screening device according to any of claim 1 wherein the first screen comprises slotted plates, and the second screen comprises perforated plates.

5. The two stage pulp screening device according to claim 1 wherein the first screen and the second screen are both fine screens.

6. The two stage pulp screening device according to claim 1 wherein two helical baffles are mounted on the inlet baffle, starting approximately 180° apart and extending downwards terminating above the bottom of the first screen thus leaving the lower portion of the first annular space unobstructed.

7. The two stage pulp screening device according to any of claim 1 wherein the rotor has a streamlined shape in the form of a truncated cone with an upper portion having a peripheral wall disposed at a greater angle to the vertical axis than that of the peripheral wall of a lower portion of the truncated cone.

8. The two stage pulp screening device according to any of claim 1 wherein the first screen and the second screen are approximately the same diameter, and a means is provided to rotate the foil cleaning bar and the rotor as one unit.

9. The two stage pulp screening device according to claim 1, wherein the said inlet to the further annular chamber is a tangetial inlet adapted to feed pulp slurry into the further annular space so that the slurry rotates thereabout as it rises up therein.

10. A two stage pressure pulp screening device comprising: a cylindrical housing containing an upper pulp screening chamber and a lower pulp screening chamber;

the lower pulp screening chamber having a first stationary cylindrical screen with a rotor mounted for rotation therein about a vertical axis, the rotor being in the form of a truncated cone with an upper portion and a lower portion, with the peripheral wall of the upper portion having an angle to the vertical axis greater than the angle of the peripheral wall of the lower portion, and impeller blades radiating from the rotor and extending to within a short distance of the inward facing surface of the first screen;

the upper pulp screening chamber having a second stationary cylindrical screen approximately the same diameter as the first screen with at least one foil cleaning bar internally mounted for rotation about the vertical axis in conjunction with the rotor, a cylindrical inlet baffle surrounding the second screen forming a first annular space therebetween, at least one helical baffle mounted on the inlet baffle forming a spiral passageway within the first annular space to feed pulp slurry downwards through the first annular space along a spiral path, a further annular space surrounding the inlet baffle and in communication with a pulp slurry inlet such that pulp slurry is fed into said further annular space, means for blocking off the first annular space and the further annular space from communication with each other at the lower ends thereof, and said upper chamber being opened over the top of said inlet baffle placing the first annular space and the further annular space into communication with each other over the inlet baffle, whereby pulp slurry fed into the upper chamber is first received in the further annular space where it rises up the outer side of the inlet baffle and spills thereover into the first annular space, and a reject discharge means positioned in a lower portion of the first annular space.

* * * * *